United States Patent

[11] 3,588,712

[72] Inventor Tadashi Uozumi
 New York, N.Y.
[21] Appl. No. 757,183
[22] Filed Aug. 2, 1968
[45] Patented June 28, 1971
[73] Assignee Fujitsu Limited
 Kawasaki, Japan
[32] Priority Dec. 28, 1963
[33] Japan
[31] 38/71086
 Continuation-in-part of application Ser. No.
 420,994, Dec. 24, 1964.

[54] TWO LEVEL WEAK SIGNAL DETECTING CIRCUIT
 7 Claims, 36 Drawing Figs.
[52] U.S. Cl. ................................................. 328/150,
 328/117, 307/235
[51] Int. Cl. .................................................... H03k 5/153,
 H03k 17/00
[50] Field of Search .......................................... 328/115,
 116, 117, 146, 147, 148, 135, 150

[56] References Cited
UNITED STATES PATENTS

| | | | |
|---|---|---|---|
| 2,760,064 | 8/1956 | Bell .............................. | 328/117 |
| 2,946,010 | 7/1960 | Tarczy-Hornoch .......... | 328/116 |
| 3,093,799 | 6/1963 | Hansen ......................... | 328/115 |
| 3,122,729 | 2/1964 | Bothwell ...................... | 328/115 |
| 3,327,230 | 6/1967 | Konian ......................... | 328/150 |

Primary Examiner—Donald D. Forrer
Assistant Examiner—Larry N. Anagnos
Attorneys—Curt M. Avery, Arthur E. Wilfond, Herbert L. Lerner and Daniel J. Tick ABSTRACT: An input circuit detects an input signal at first and second determined magnitude levels different from each other to produce first and second pulses spaced from each other by a time interval. One of the first and second pulses is absent when the input signal is a weak signal having a magnitude between the first and second levels. An indicating circuit connected to the input circuit indicates the absence of one of the first and second pulses spaced from the other by the time interval.

Patented June 28, 1971 3,588,712
5 Sheets-Sheet 2
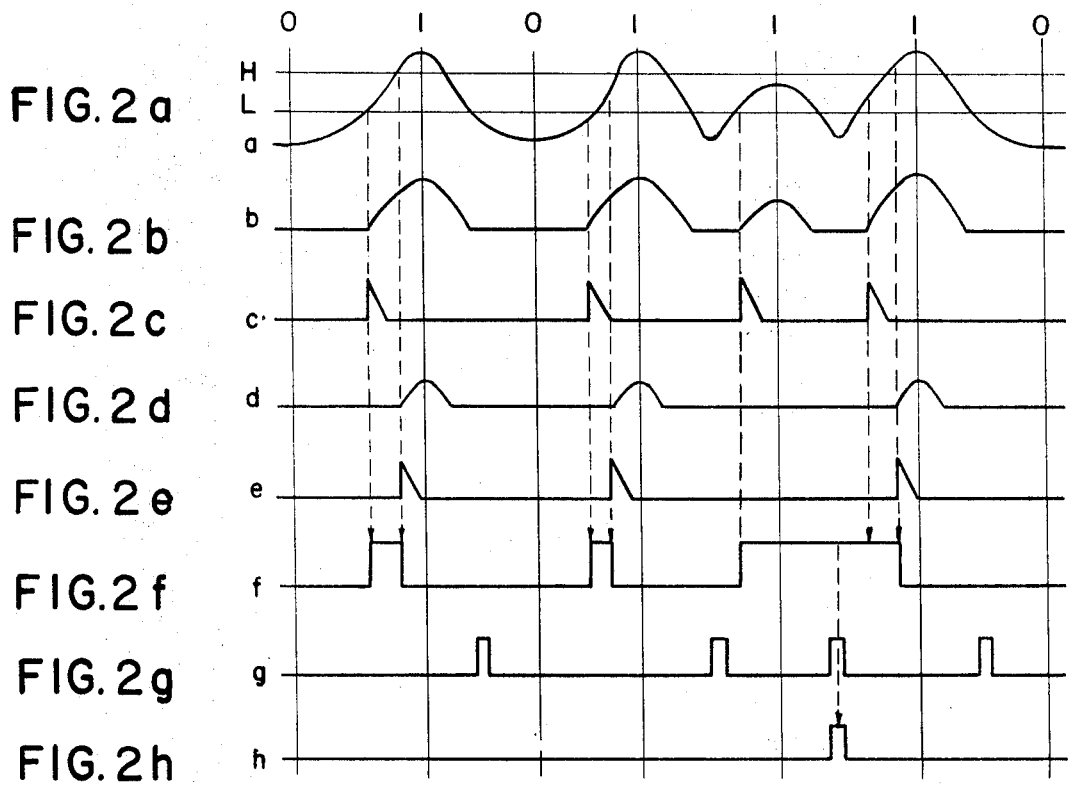
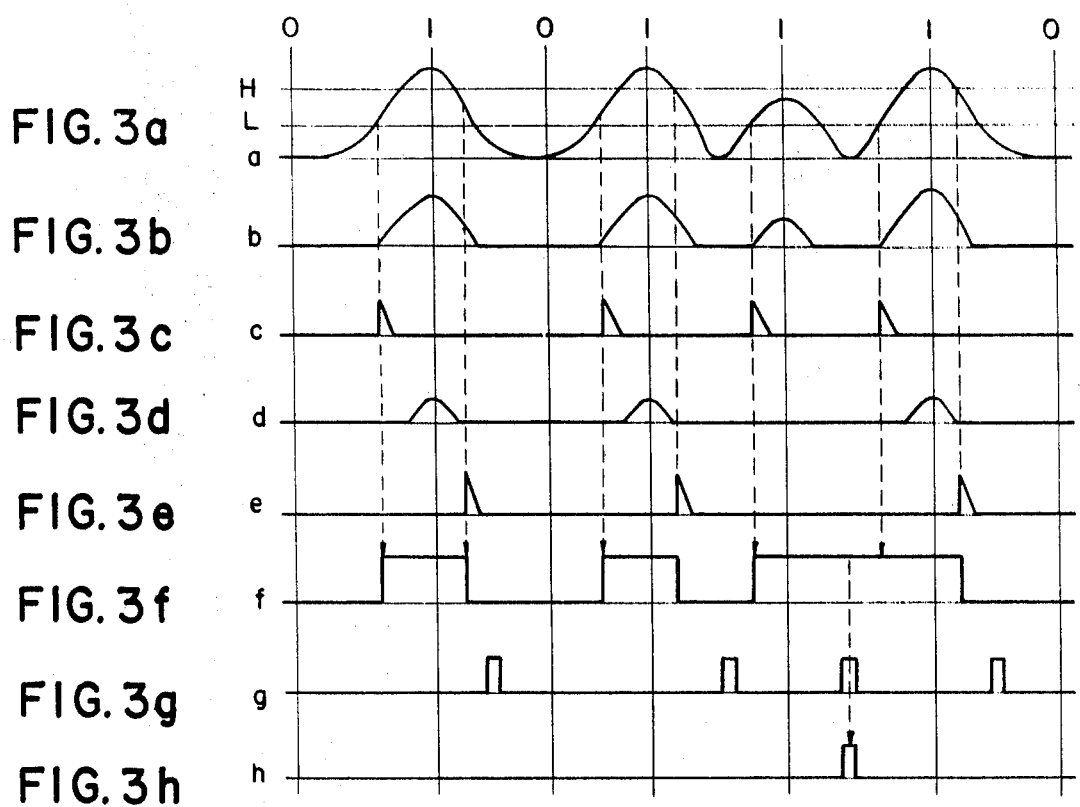

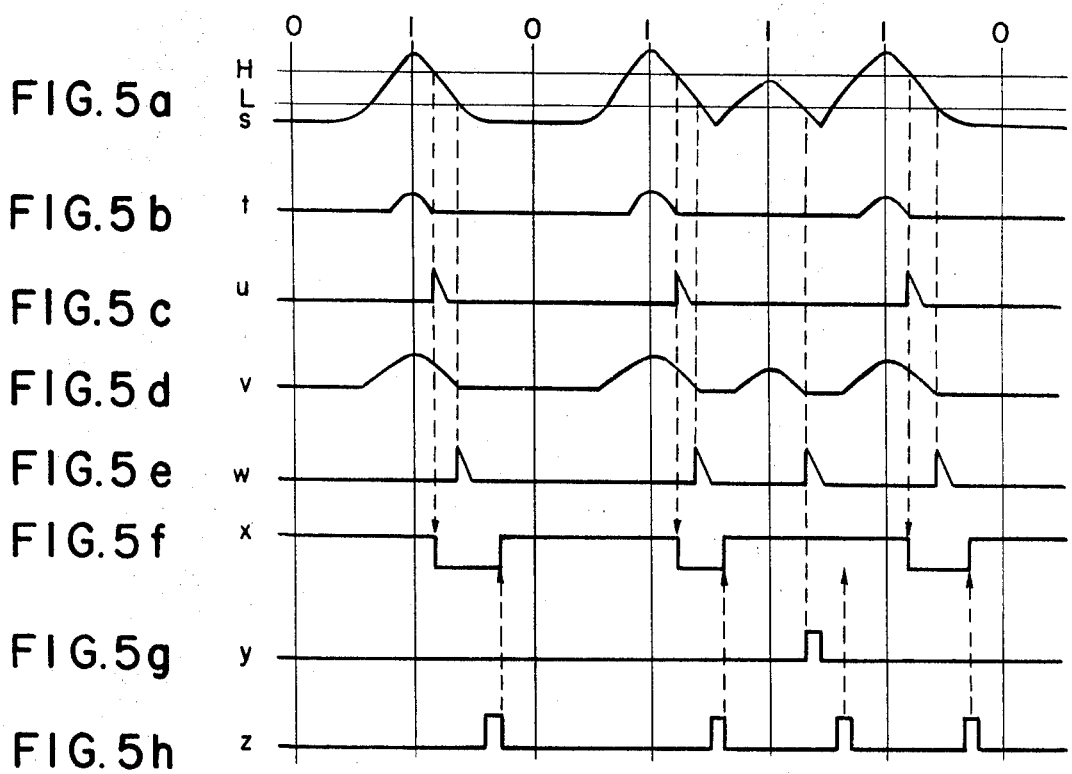
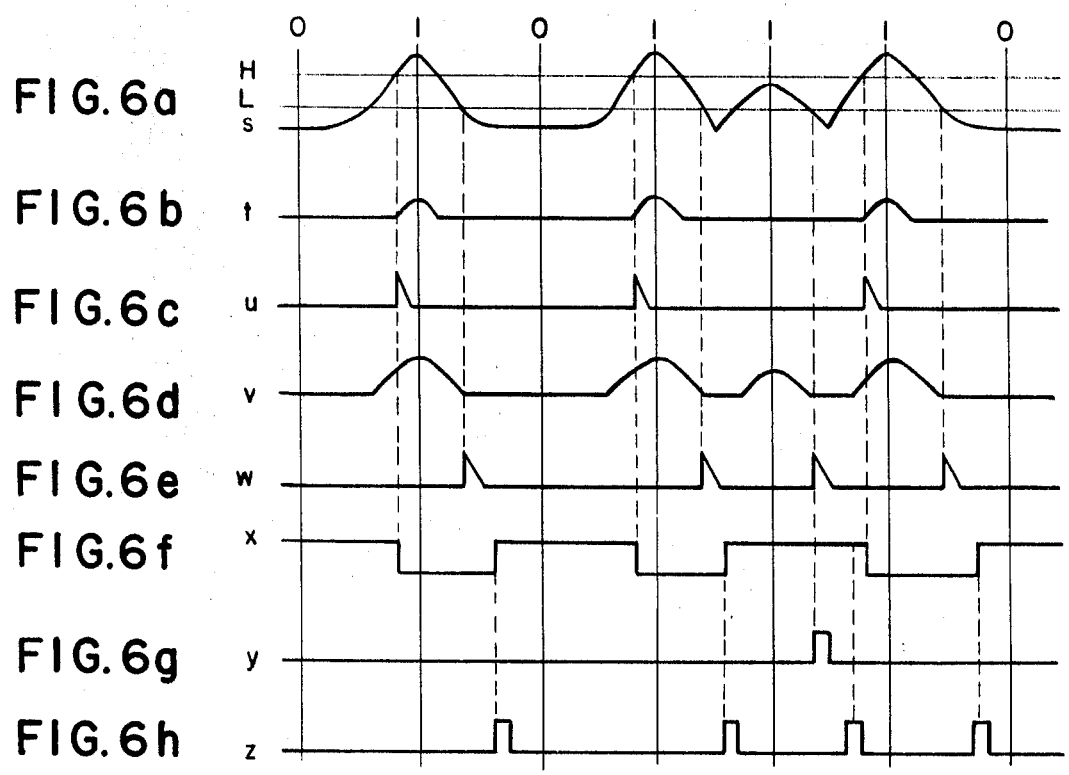

TWO LEVEL WEAK SIGNAL DETECTING CIRCUIT

DESCRIPTION OF THE INVENTION

The present application is a continuation-in-part of copending application Ser. No. 420,994, filed Dec. 24, 1964, and entitled "Two Level Weak Signal Detecting Circuit."

The present invention relates to a two level weak signal detecting circuit. More particularly, the invention relates to a two level weak signal detecting circuit for indicating accurately the presence of weak signals.

The signals detected may be recorded in any suitable manner such as, for example, on magnetic tape, on a magnetic disc, on a magnetic drum, or in a data processing system. In known types of signal and noise detecting circuits, the signals detected are sensed at a determined level below which noise is to be suppressed. Signals above the determined level are detected as normal or data signals and signals below the determined level are detected as noise. In such circuits, it is impossible to distinguish strong noise which is just below the determined level or a weak signal which is just above the determined level. This may lead to errors in the detected output data.

In known types of signal and noise detecting circuits, the magnitude of the signals detected varies to a considerable extent for various reasons and gives rise to further errors in the detected output data. Errors may occur in the reproduction of the signals recorded on a magnetic medium, so that the output of the detector contains errors. This is particularly evident in high speed detection of high density data such as, for example, in magnetic tape memory apparatus wherein the density may be approximately 30 bits per millimeter and the tape speed may be 4 meters per second.

The two level detecting circuit of the present invention avoids the disadvantages of the known circuits. In the two level detecting circuit of the present invention, two different determined levels of detection are utilized in such a manner that normal signals or data signals are detected at both of the two levels whereas noise or noise signals are not detected at either of said two levels and confirmation of weak signals is provided.

The principal object of the present invention is to provide a new and improved weak signal detecting circuit.

An object of the present invention is to provide a two level weak signal detecting circuit.

An object of the present invention is to provide a new and improved weak signal detecting circuit for reproduced magnetically recorded signals.

In accordance with the present invention, when a signal detected at a first determined level is received and is followed by a signal detected at a second determined level, both signals being derived from a single input signal, such input signal is a normal or data signal and is indicated as such by the production of no output signal by the two level detecting circuit. If a weak signal is not detected at one of the first and second levels, so that only one of the first and second levels detects a signal and not the other, two signals being derived from a single weak input signal, such weak input signal is indicated as such by the production of an output signal by the two level detecting circuit. If a noise signal is not detected at either of the first and second levels, so that neither the first nor the second levels detects a signal, two signals being derived from a single noise input signal, such input noise signal is indicated as such by the production of no output signal by the two level detecting circuit.

In order that the present invention may be readily carried into effect, it will now be described with reference to the accompanying drawings, wherein:

FIGS. 2a, 2b, 2c, 2d, 2e, 2f, 2g and 2h and FIGS. 3a, 3b, 3c, 3d, 3f, 3g and 3h illustrate waveforms appearing in the circuit of FIG. 1 and serve to explain its operation;

FIGS. 5a, 5b, 5c, 5d, 5e, 5f, 5g and 5h and FIGS. 6a, 6b, 6c, 6d, 6e, 6f, 6g and 6h illustrate waveforms appearing in the circuit of FIG. 4 and serve to explain its operation;

Figure 1:
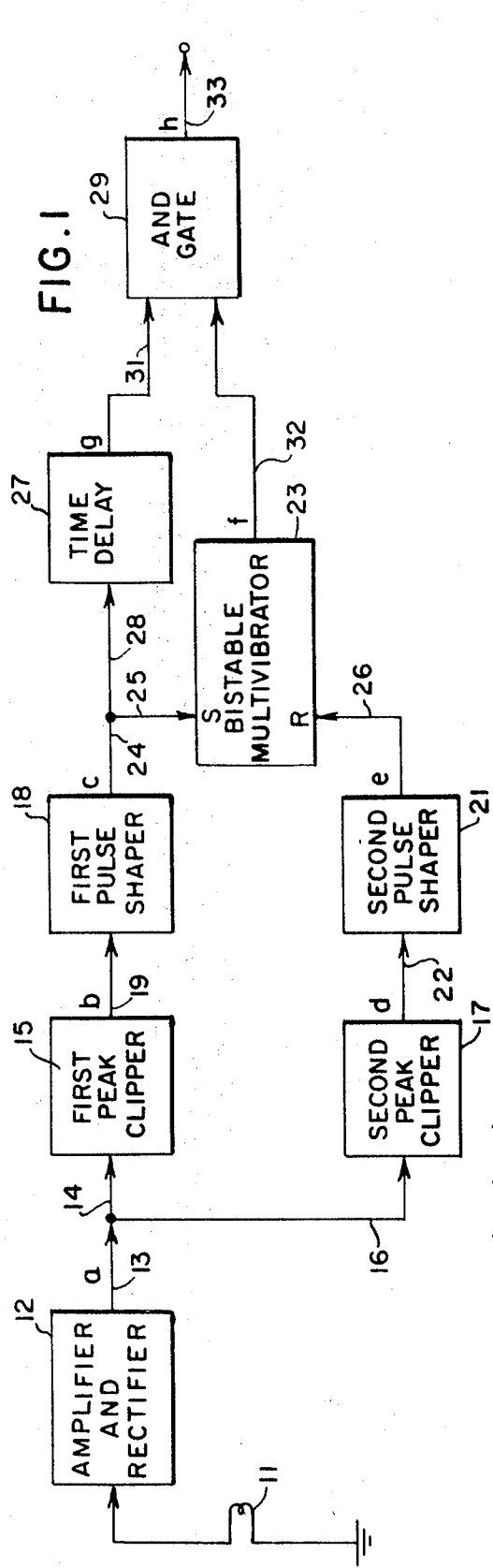
FIG. 1 is a block diagram of an embodiment of the two level weak signal detecting circuit of the present invention.
Figure 4:
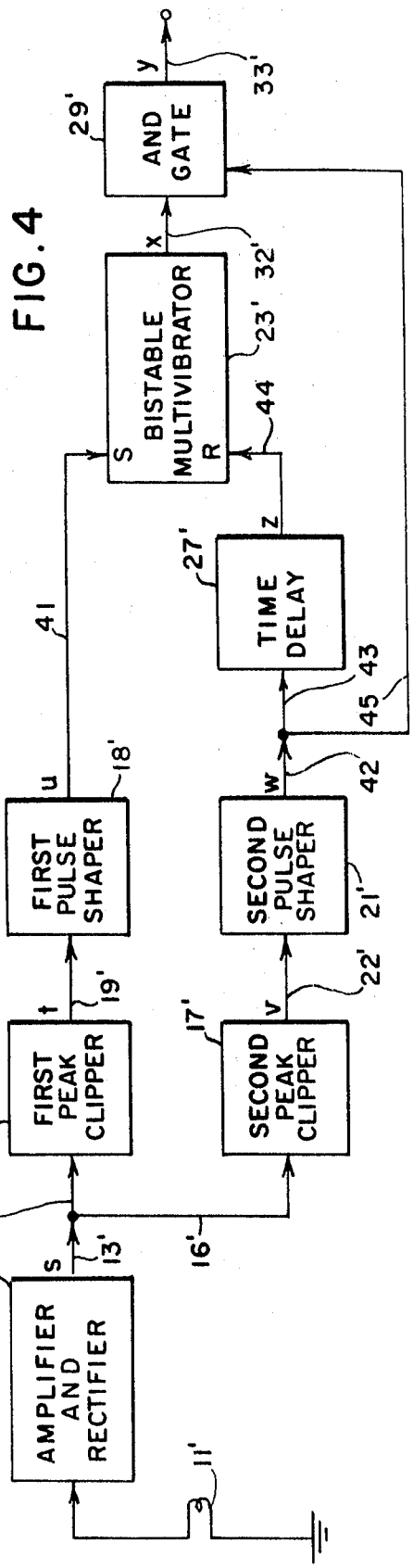
FIG. 4 is a block diagram of a modification of the embodiment of FIG. 1.
Figure 7:
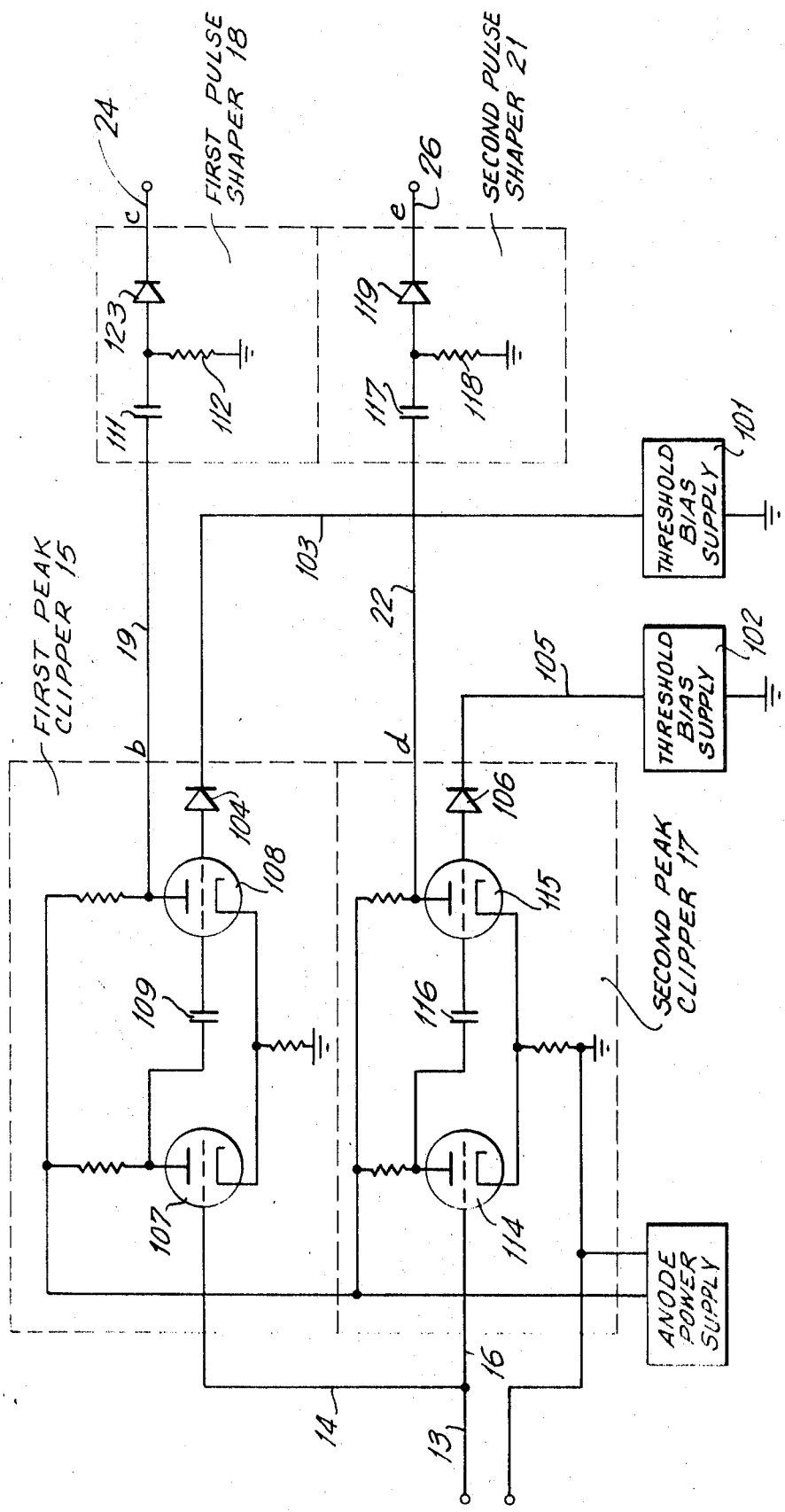
Figure 8:
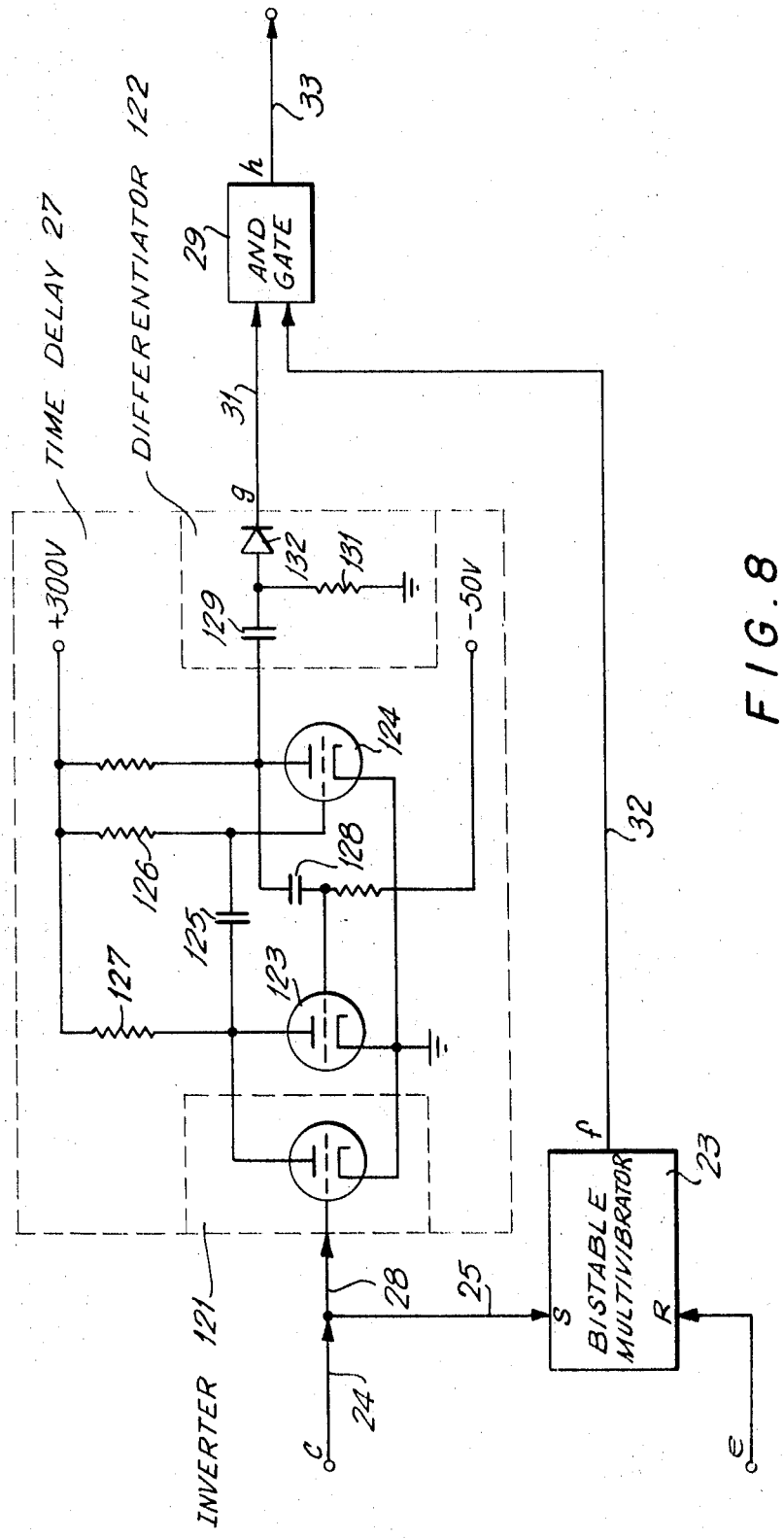

FIG. 7 is a circuit diagram of the first peak clipper 15, the second peak clipper 17, the first pulse shaper 18 and the second pulse shaper 21 of FIG. 1 and the corresponding components of FIG. 4; and FIG. 8 is a circuit diagram of the time delay 27 of FIG. 1 and the corresponding component of FIG. 4.

In FIG. 1, a reproducing head 11 provides an input signal as a result of sensing a magnetic storage medium (not shown) and supplies the input signal to an amplifier and rectifier circuit 12. The amplifier and rectifier circuit 12 produces a waveshape shown in FIG. 2a at its output and feeds the output signal via lines 13 and 14 to a first peak clipper 15 and via lines 13 and 16 to a second peak clipper 17.

The first peak clipper 15 clips the wave produced by the amplifier and rectifier 12 at ta first lower level L (FIG. 2a) to produce an output wave or pulse shown in FIG. 2b. The second peak clipper 17 clips the wave produced by the amplifier and rectifier 12 at a second higher level H (FIG. 2a) to produce an output wave or pulse shown in FIG. 2d. The first and second peak clippers 15 and 17 may comprise any suitable clipper circuits known in the art such as, for example, Schmitt trigger circuits as described in the textbook entitled "Pulse and Digital Circuits" by Jacob Millman and Herbert Taub, 1956, McGraw-Hill Book Company, pages 164 to 168 and on pages 190 and 191 of "Directory of Electronic Circuits," by Matthew Mandl, Prentice-Hall, Inc., 1966.

FIG. 7 discloses the peak clippers and pulse shapers of FIGS. 1 and 4.

The output wave or pulse produced by the first peak clipper 15 (FIG. 2b) is supplied to a first pulse shaper 18 via a line 19. The first pulse shaper 18 produces an output pulse as shown in FIG. 2c. The output wave or pulse produced by the second peak clipper 17 (FIG. 2d) is supplied to a second pulse shaper 21 via a line 22. The second pulse shaper 21 produces an output pulse as shown in FIG. 2e. As indicated in FIGS. 2b and 2c and in FIGS. 2d and 2e, each of the first and second pulse shapers 18 and 21 functions to produce an output pulse which is sharp relative to the wave fed into said pulse shapers and which occurs at the leading edge of each pulse fed into said pulse shapers. The first and second pulse shapers 18 and 21 may comprise any suitable pulse shaping circuits known in the art such as, for example, as described in the aforementioned textbook on pages 31, 32 and 48 combined with pages 167 and 168.

The output pulses produced by the first pulse shaper 18 are fed to the set input of a bistable multivibrator or flip-flop 23 via lines 24 and 25. The output pulses produced by the second pulse shaper 21 are fed to the reset input of the bistable multivibrator 23 via a line 26. The bistable multivibrator or flip-flop 23 may comprise any suitable circuit arrangement known in the art such as, for example, described in the aforementioned textbook on pages 140 to 173.

The output of the first pulse shaper 18 is supplied to a time delay 27 via a line 28. The pulse output of the first pulse shaper 18 is delayed by the time delay 27 and is then provided at the output of said time delay. The time delay 27 is adjusted to delay a signal fed to it via the line 28 a period of time greater than the time interval between the output pulses or signals produced by the first and second pulse shapers 18 and 21, as indicated in FIGS. 2c, 2e and 2g. The output pulse of the time delay 27 is supplied to an AND gate 29 via a lead 31. The output pulse or signal of the flip-flop 23 is supplied to the AND gate 29 via a line 32.

The time delay 27 may comprise any suitable time delay means known in the art. FIG. 8 discloses the time delay circuit of FIGS. 1 and 4. The AND gate 29 may comprise any suitable AND gate known in the art such as, for example, as described on pages 397 to 400 of the aforementioned textbook.

If only noise appears as the input signal to the amplifier and rectifier 12 of the two level detector circuit of the present invention, such noise is completely eliminated by the first and second peak clippers 15 and 17 since its magnitude is below the magnitude of the determined lower level L (FIG. 2a). The AND gate 29 thus produces no output signal at its output 33 because no output signals are produced by the first and second peak clippers 15 and 17.

If a data signal or normal signal is supplied by the reproducing head 11 as the input signal to the amplifier and rectifier 12 of the two level detector circuit of the present invention, such signal is clipped by the first and second peak clippers 15 and 17 and the outputs of the peak clippers are supplied to the set and reset inputs of the flip-flop 23 after being shaped by the first and second pulse shapers 18 and 21. The flip-flop 23 thus produces no output signal, so that AND gate 29 produces no signal at its output 33.

If the input signal supplied to the amplifier and rectifier 12 is a weak one it is not detected at the second or higher determined level H (FIG. 2a) since its magnitude is lower than the magnitude of said determined higher level. The second peak clipper 17 thus produces no output signal, so that the second pulse shaper does not produce an output signal and there is no signal fed to the reset input of the flip-flop 23. The flip-flop 23 therefore remains in its set condition. The first peak clipper 15 produces a pulse as shown in FIG. 2b which is fed to the first pulse shaper 18. The first pulse shaper 18 produces a pulse as shown in FIG. 2c which is fed to the flip-flop 23 and to the time delay 27. The flip-flop 23, being in its set condition, produces an output pulse as shown in FIGS. 2f. The time delay 27 provides an output pulse as shown in FIG. 2g. The output pulse of the flip-flop 23 is fed to the AND gate 29 via the line 32 and the output pulse at the time delay 27 is fed to said AND gate via the line 31. Since there are simultaneous signals in both input lines 31 and 32 of the AND gate 29, said AND gate is switched to its conductive condition and provides an output pulse as shown in FIG. 2h.

Thus, an output signal appears in the output line 33 of the AND gate 29 only when a weak signal is supplied by the reproducing head or other input means as an input signal to the circuit. This enables the use of the two level weak signal detecting circuit of the present invention to examine and confirm data recorded on a magnetic medium and reproduced by the reproducing head 11.

FIGS. 3a, 3b, 3c, 3d, 3e, 3f, 3g, and 3h are waveforms for the circuit of FIG. 1 wherein the first pulse shaper 18 functions in the same manner as explained to produce a sharp pulse at the leading edge of the pulse supplied by the first peak clipper 15. The second pulse shaper 21, however, functions to produce a sharp pulse at the trailing edge of the pulse supplied by the second peak clipper 17. The operation of the two level detector circuit is the same as that described except that the period during which the flip-flop 23 is in its set condition is longer, as shown in FIG. 3f, and the time interval between the output pulses produced by the first and second pulse shapers 18 and 21, as shown in FIGS. 3c and 3e, is longer, so that the time delay 27 delays a signal fed to it for a period of time greater than in the instance where both pulse shapers produce a sharp output pulse at the leading edge of the pulse produced by the peak clippers.

In FIG. 4, a reproducing head 11' provides an input signal to an amplifier and rectifier circuit 12'. The amplifier and rectifier circuit 12' produces a waveshape s shown in FIG. 5a at its output and feeds the output signal via lines 13' and 14' to a first peak clipper 15' and via lines 13' and 16' to a second peak clipper 17'.

The first peak clipper 15' clips the wave produced by the amplifier and rectifier 12' at a second higher level H (FIG. 5a) to produce an output wave or pulse t shown in FIG. 5b. The second peak clipper 17' clips the wave produced by the amplifier and rectifier 12' at a first lower level L (FIG. 5a) to produce an output wave or pulse v shown in FIG. 5d.

The output wave or pulse t produced by a first peak clipper 15' (FIG. 5b) is supplied to a first pulse shaper 18' via a line 19'. The first pulse shaper 18' produces an output pulse u as shown in FIG. 5c. The output pulse or wave v produced by the second peak clipper 17' (FIG. 5d) is supplied to a second pulse shaper 21' via a line 22'. The second pulse shaper 21' produces an output pulse w as shown in FIG. 5e. As shown in FIGS. 5b and 5c and in FIG. 5d and FIG. 5e, each of the first and second pulse shapers 18' and 21' functions to produce an output pulse which is sharp relative to the wave fed into said pulse shapers and which occur at the trailing edge of each pulse fed into said pulse shapers.

The output pulses produced by the first pulse shaper 18' are fed to the set input of a bistable multivibrator or flip-flop 23' via a line 41. The output pulses produced by the second pulse shaper 21' are fed to a time delay 27' via lines 42 and 43. The pulse output of the second pulse shaper 21' is delayed by the time delay 27' and is then provided at the output of said time delay. The time delay 27' is adjusted to delay a signal fed to it via the line 43 a period of time greater than the time interval between the output pulses or signals u, w and z produced by the first and second pulse shapers 18' and 21', as indicated in FIGS. 5c, 5e and 5h.

The output pulse z of the time delay 27' is supplied to the reset input of the flip-flop 23' via a line 44. The output pulse of the second pulse shaper 21' is supplied to an AND gate 29' via lines 42 and 45. The output pulse or signal of the flip-flop 23' is supplied to the AND gate 29' via a line 32'.

If only noise appears as the input signal to the amplifier and rectifier 12' of the two level detector circuit of FIG. 4, such noise is completely eliminated by the first and second peak clippers 15' and 17' since its magnitude is below the magnitude of the determined lower level L (FIG. 5a). The AND gate 29' thus produces no output signal at its output 33' because no output signals are produced by the first and second peak clippers 15' and 17'.

If a data signal or normal signal is supplied by the reproducing head 11' as the input signal to the amplifier and rectifier 12' of the two level detector circuit of FIG. 4, such signal is slipped by the first and second peak clippers 15' and 17' and the outputs of the peak clippers are supplied to the set and reset inputs of the flip-flop 23' after being shaped by the first and second pulse shapers 18' and 21'. The flip-flop 23' produces no output signal, so that the AND gate 29' produces no signal at its output 33'.

If the input signal supplied to the amplifier and rectifier 12' is a weak one it is not detected at the second or higher determined level H (FIG. 5a) since its magnitude is lower than the magnitude of said determined higher level. The first peak clipper 17' thus produces no output signal, so that the first pulse shaper does not produce an output signal and there is no signal fed to the set input of the flip-flop 23'. The flip-flop 23' therefore remains in its reset condition. The second peak clipper 17' produces a pulse v, as shown in FIG. 5d, which is fed to the second pulse shaper 21'. The second pulse shaper 21' produces a pulse w, as shown in FIG. 5e, which is fed to the AND gate 29' and to the time delay 27'. The time delay 27' provides an output pulse z, as shown in FIG. 5h, which is fed to the reset input of the flip-flop 23' via the line 44. The flip-flop 23', being in its reset condition, produces an output pulse x, as shown in FIG. 5f. Since there are simultaneous signals in both input lines 45 and 32' of the AND gate 29', said AND gate is switched to its conductive condition and provides an output pulse y, as shown in FIG. 5g.

Thus, an output signal appears in the output line 33' of the AND gate 29' only when a weak signal is supplied by the reproducing head or other input means as an input signal to the circuit.

FIGS. 6a, 6b, 6c, 6d, 6e, 6f, 6g and 6h show the waveforms s, t, u, v, w, x, y and z for the circuit of FIG. 4 wherein the second pulse shaper 21' functions in the same manner as explained to produce a sharp pulse at the trailing edge of the pulse supplied by the second peak clipper 17'. The first pulse shaper 18', however, functions to produce a sharp pulse at the leading edge of the pulse supplied by the first peak clipper 15'. The operation of the two level detector circuit is the same as that described except that the period during which the flip-flop 23' is in its reset condition is longer, as shown in FIG. 6f, and the time interval between the output pulses produced by the first and second pulse shapers 18' and 21', as shown in FIGS. 6c and 6e, is longer, so that the time delay 27' delays a signal fed to it for a period of time greater than in the instance where both pulse shapers produce a sharp output pulse at the trailing edge of the pulse produced by the peak clippers.

FIG. 7 discloses the circuits of the first peak clipper 15, the second peak clipper 17, which circuits are identical, and the first pulse shaper 18 and the second pulse shaper 21, which circuits are identical. Each of the first and second peak clippers 15 and 17 comprises a well known Schmitt trigger circuit, as shown in fIG. 7. The waveform of the signal in the line 13 (FIG. 1) is supplied to the first peak clipper 15 via the line 14 and is supplied to the second peak clipper 17 via the line 16. The first peak clipper 15 clips the signal at a low voltage level L by means of a threshold bias supply 101. The second peak clipper 17 clips the signal at a higher voltage level H by means of a threshold bias supply 102. The bias voltage is applied to the first peak clipper 15 via a line 103 and a diode 104 and the bias voltage is applied to the second peak clipper 17 via a line 105 and a diode 106. Although vacuum tubes are indicated as the electronic components of the Schmitt trigger circuit, transistors may obviously be utilized as shown in the Mandl textbook cited on page 4 of the specification.

The tube 107 of the first peak clipper 15 is switched to its conductive conditions when the input waveform reaches the voltage level L. The signal is transferred to the tube 108 via the capacitor 109 and said tube 108, formerly in its conductive condition, is switched to its nonconductive condition. As a result, an abrupt voltage of high level is produced on the line 19 connected to the anode of the tube 18. Such voltage is indicated in FIG. 2b.

The line 19 connects the output of the tube 108, and therefore of the first peak clipper 15, to the input of the first pulse shaper 18. The first pulse shaper 18 differentiates the voltage supplied to it and produces a waveform shown in FIG. 2c which is transferred via the line 24 (FIG. 1). The first pulse shaper 18 comprises a differentiator of known type having a capacitor 111, a resistor 112 and a diode 113. The diode 113 sufficiently transmits only the change in the positive direction. This results in the brief, sharp trigger pulses shown in FIG. 2c. The second peak clipper 17 and the second pulse shaper 21 comprise the same circuitry as the first peak clipper 15 and the first pulse shaper 18, respectively, and function in the same manner. The difference between the first circuits and the second circuits is that the threshold bias supply 102 has a higher magnitude than the threshold bias supply 101, so that the signal is clipped at the level H (FIG. 2a). The signal provided in the line 22 thus has a waveform as shown in FIG. 2d. When the input signal or waveform reaches the level H, the tube 114 of the second peak clipper 17 is switched from its nonconductive to its conductive condition. The signal is supplied from the tube 114 to the tube 115 via the capacitor 116 and switches the tube 115 from its conductive to its nonconductive condition.

The second pulse shaper 21 comprises a differentiator having a capacitor 117, a resistor 118 and a diode 119. The second pulse shaper 21 provides on the line 26 the same type of sharp, brief pulses as provided by the first pulse shaper, 18. Such pulses are shown in FIG. 2e. Since the input signal does not exceed the level H in magnitude, the second peak clipper 17 does not, in the illustrative example of the initial disclosure, produce an output signal.

Although any suitable time delay circuit may be utilized as the time delay 27, a monostable multivibrator may be utilized in a known manner as the time delay circuit. Such a monostable multivibrator is illustrated in FIG. 8. In FIG. 8, an inverter 121 is connected in the input of the multivibrator constituting the time delay 27 and a differentiator 122 is connected in the output of said multivibrator. The monostable multivibrator of FIG. 8 functions in a known manner.

Positive trigger pulses are supplied to the input of the monostable multivibrator via the lines 24 and 28 (FIG. 1). The input trigger pulses are inverted by the inverter 121 so that negative trigger pulses produced by said inverter are supplied to the anode of the tube 123 of the multivibrator. The negative trigger pulses are supplied directly to the grid of the tube 124 via the capacitor 125. The negative pulses cause the grid voltage of the tube 124 to become abruptly negative so that said tube is switched from its conductive to its nonconductive condition. The tube 123 is simultaneously switched from its nonconductive to its conductive condition.

When the tube 124 is switched to its conductive condition, its plate potential decreases from a high positive potential to ground potential. While the tube 123 is in its nonconductive condition, the potential at one plate of the capacitor 125 becomes equal to that at its other plate due to resistors 126 and 127. This causes the capacitor 125 to discharge in small increments in accordance with the resistance values of the resistors 126 and 127. Upon the completion of the discharge of the capacitor 125, the grid potential of the tube 124 switches said tube from its conductive to its nonconductive condition.

Upon the completion of the discharge of the capacitor 125, therefore, the tube 124 is switched to its nonconductive condition, so that the anode potential of said tube increases abruptly and positively. The abrupt change of anode potential is applied to the other tube 123 via a capacitor 128 and switches the tube 123 to its conductive condition. This closes a circuit between the 300 volt power supply and ground via the resistor 126, the capacitor 125 and the tube 123 and permits the commencement of charging of the capacitor 125. The monostable multivibrator thereby returns to its rest condition.

The positive increase in plate potential of the tube 124 is applied to the line 31 (FIG. 1) via the differentiator 122. The differentiator 122 comprises a capacitor 129, a resistor 131 and a diode 132. The differentiator 122 produces an output only when the diode 132 permits the application of a voltage to the line 31 due to a change in potential from a low to a high level. The waveform of the voltage applied to the line 31 is shown in FIG. 2g.

While the invention has been described by means of specific examples and in specific embodiments, I do not wish to be limited thereto, for obvious modifications will occur to those skilled in the art without departing from the spirit and scope of the invention.

I claim:

1. A two level weak signal detecting circuit for indicating a weak input signal, comprising:

first peak clipper means having an input and an output for clipping said input signal at a first determined magnitude level;

second peak clipper means having an input and an output for clipping said input signal at a second determined magnitude level different from said first determined magnitude level;

input means for supplying an input signal to the input of each of said first and second peak clipper means;

first pulse shaper means having an input connected to the output of said first peak clipper means for producing a first pulse at one of the leading edge and trailing edge of the signal produced by said first peak clipper means, said first pulse shaper means having an output;

second pulse shaper means having an input connected to the output of said second peak clipper means for producing a second pulse spaced from said first pulse by a time interval at one of the leading edge and trailing edge of the signal produced by said second peak clipper means, said second pulse shaper means having an output;

a bistable multivibrator having a set input connected to the output of said first pulse shaper means for switching said bistable multivibrator to its set condition of operation, a reset input coupled to the output of said second pulse shaper means for switching said bistable multivibrator to its reset condition of operation, and an output;

time delay for delaying a signal for a period of time longer than said time interval; and gate means having a first input connnected to the output of said bistable multivibrator, a second input coupled to the output of one of said first and second pulse shaper means and an output, said gate means being switched to a conductive condition in which it provides a signal at its output upon the simultaneous appearance of signals in both its first and second inputs and being switched to a nonconductive condition in which it provides a zero signal at its output in the absence of the simultaneous appearance of signals in both its first and second inputs so that when the input signal supplied by said input means is a weak signal having a magnitude between said first and second determined magnitude levels, one of said first and second peak clipper means produces a zero signal and the other of said first and second peak clipper means produces a signal which switches said bistable multivibrator to one of its set and reset conditions in which it produces an output signal to the first input of said gate means and which is supplied to the second input of said gate means whereby said gate means provides a signal in its output.

2. A two level weak signal detecting circuit as claimed in claim 1, wherein said second determined magnitude level is higher than said first determined magnitude level, said first pulse shaper means produces a first pulse at the leading edge of the signal produced by said first peak clipper means, and said gate means has a second input connnected to the output of said first pulse shaper means through said time delay means, and when the input signal supplied by said input means is a weak signal having a magnitude between said first and second determined magnitude levels said second peak clipper means produces a zero signal and said first peak clipper means produces a signal which switches said bistable multivibrator to its set condition in which it produces an output signal to the first input of said gate means and which is delayed and supplied to the second input of said gate means whereby said gate means provides a signal in its output.

3. A two level weak signal detecting circuit as claimed in claim 1, wherein said second determined magnitude level is lower than first determined magnitude level, said second pulse shaper means produces a second pulse spaced from said first pulse by a time interval at the trailing edge of the signal produced by said second peak clipper means, the reset input of said bistable multivibrator is connected to the output of said second pulse shaper means through said time delay means, and said gate means has a second input connected to the output of said second pulse shaper means and when the input signal supplied by said input means is a weak signal having a magnitude between said first and second determined magnitude levels, said first peak clipper means produces a zero signal and said second peak clipper means produces a signal which is supplied to the second input of said gate means and which is delayed and supplied to said bistable multivibrator to switch said bistable multivibrator to its reset condition in which it produces an output signal to the first input of said gate means whereby said gate means provides a signal in its output.

4. A two level weak signal detecting circuit as claimed in claim 2, wherein said first pulse shaper means produces said first pulse at the leading edge of the signal produced by said first peak clipper means and said second pulse shaper means produces said second pulse at the leading edge of the signal produced by said second peak clipper means.

5. A two level weak signal detecting circuit as claimed in claim 2, wherein said first pulse shaper means produces said first pulse at the leading edge of the signal produced by said first peak clipper means and said second pulse shaper means produces said second pulse at the trailing edge of the signal produced by said second peak clipper means.

6. A two level weak signal detecting circuit for indicating a weak input signal as claimed in claim 3, wherein said first pulse shaper means produces said first pulse at the trailing edge of the signal produced by said first peak clipper means and said second pulse shaper means produces said second pulse at the trailing edge of the signal produced by said second peak clipper means.

7. A two level weak signal detecting circuit for indicating a weak input signal as claimed in claim 3, wherein said first pulse shaper means produces said first pulse at the leading edge of the signal produced by said first peak clipper means and said second pulse shaper means produces said second pulse at the trailing edge of the signal produced by said second peak clipper means.